United States Patent [19]

Nakamura

[11] Patent Number: 5,331,535
[45] Date of Patent: Jul. 19, 1994

[54] POWER CONVERSION CONTROL APPARATUS

[75] Inventor: Naomi Nakamura, Saitama, Japan

[73] Assignee: Kabushiki Kaisha Toshiba, Kawasaki, Japan

[21] Appl. No.: 85,494

[22] Filed: Jul. 2, 1993

[30] Foreign Application Priority Data

Aug. 17, 1992 [JP] Japan .................................. 4-217566

[51] Int. Cl.$^5$ ............................................. H02M 5/45
[52] U.S. Cl. .......................................... 363/37; 363/35
[58] Field of Search .................... 363/35, 37, 85, 87, 363/96, 98, 128, 129, 135, 136, 137

[56] References Cited

U.S. PATENT DOCUMENTS

| | | | |
|---|---|---|---|
| 4,555,750 | 11/1985 | Matsumura et al. | 363/37 |
| 4,648,018 | 3/1987 | Neupauer | 363/35 |
| 4,685,044 | 8/1987 | Weibelzahl et al. | 363/35 |
| 5,010,467 | 8/1991 | Tokiwa et al. | 363/37 |
| 5,272,617 | 12/1993 | Nakamura | 363/37 |

*Primary Examiner*—Steven L. Stephan
*Assistant Examiner*—Matthew Nguyen
*Attorney, Agent, or Firm*—Foley & Lardner

[57] ABSTRACT

A power conversion system has a control circuit constituted by a dual system. The control circuit of each system is equipped with a current control circuit. The current control circuit has a selection circuit that, after determining the magnitude of the output of an integrating amplifier of its own system and the output of an integrating amplifier of the other system, selects one of the outputs of the two integrating amplifiers. The selection circuit applies a signal responsive to a difference between the output of the integrating amplifier of its own system and the output of the selection circuit of its own system as correction signal to the input of the integrating amplifier of its own system. Accordingly, when the power conversion system is utilizes a dual control system, even when the current control circuit includes an integration algorithm, control can be performed by the two systems without saturation due to the integration algorithm.

3 Claims, 4 Drawing Sheets

POWER CONVERSION CONTROL APPARATUS

BACKGROUND OF THE INVENTION

1. Field of the Invention

This invention relates to a power conversion control apparatus for controlling a converter which converts AC power to DC power or DC power to AC power. More specifically, the power conversion control apparatus is constituted by a dual system.

2. Description of the Related Art

FIG. 1 shows a block diagram of a power conversion control apparatus for a DC power supply system.

Referring to FIG. 1, the DC sides of converters 1A and 1B are connected to DC power supply line 3 by means of respective DC reactors 2A and 2B. The AC sides of converters 1A and 1B are connected to AC systems 6A and 6B respectively through transformers 4A and 4B and circuit breakers 5A and 5B.

The control sections of converters 1A and 1B comprise constant-voltage control circuits 11A and 11B, constant margin angle control circuits 12A and 12B and constant-current control circuits 13A and 13B. The constant margin angle control circuits 12A and 12B operate such that the margin angle of converters 1A and 1B tracks a margin angle reference value which is output from margin angle selectors 18A and 18B. DC voltage selectors 14A and 14B set respective voltage reference values. Each DC voltage across supply line 3 is detected by DC voltage detectors 15A and 15B. The detected DC voltage is provided to voltage/voltage conversion circuits 16A and 16B. The voltage/voltage conversion circuits 16A and 16B convert the detected DC voltage to a voltage level appropriate for the power conversion control apparatus. First comparators 17A and 17B receive the converted voltage from the voltage/voltage conversion circuits 16A and 16B and the voltage reference value from the DC voltage selectors 14A and 14B and calculate the difference between the converted value and the voltage reference value. The difference is provided to the constant-voltage circuits 11A and 11B. The voltage difference signal is generated so that the DC voltage of DC power supply line 3 follows the voltage reference value.

Further, transmission control circuits 26A and 26B output current reference values to second comparators 23A and 23B respectively. The second comparators 23A and 23B receive detected DC current and a current reference value. The DC current is detected by current detectors 21A and 21B and the detected DC current is converted by current/voltage conversion circuits 22A and 22B to an appropriate level for use by the power conversion control apparatus. The second comparators 23A and 23B calculate a difference between the DC current from current/voltage conversion circuits 22A and 22B and the current reference value from the transmission control circuits 26A and 26B, and provide the calculated difference to the constant-current control circuits 13A and 13B. The current reference value is provided from a current reference output circuit 27 to the transmission control circuit 26A, and is transmitted to the transmission control circuit 26B through a transmission line 19.

When the converters 1A and 1B perform an inverse power conversion operation (DC to AC), switches 24A and 24B are closed. Thus, when the converter 1A performs the inverse power conversion operation, the switch 24A is closed and when the converter 1B performs the inverse power conversion operation, the switch 24B is closed. When the switches 24A and 24B are closed, current margins which are output from current margin selectors 25A and 25B are provided to the second comparators 23A and 23B respectively. This operation is called "a current margin operation."

Control advance angle priority circuits 28A and 28B receive the outputs of constant-voltage circuits 11A and 11B, constant margin angle control circuits 12A and 12B and constant-current control circuits 13A and 13B, and output the largest one of the three inputs (with the most advanced control angle). The output from the control advance angle priority circuits 28A and 28B is provided to phase control circuits 29A and 29B, respectively. The phase control circuits 29A and 29B convert the output from the control advance angle priority circuits 28A and 28B to pulse signals which determine firing timing of the converters 1A and 1B. The pulse signals from the phase control circuits 29A and 29B are provided to the converters 1A and 1B as gate pulse signals through pulse amplification circuits 30A and 30B.

Next, a power conversion control apparatus for controlling the converter 1A which is constructed as a dual system will be described.

FIG. 2 shows a block diagram of the power conversion control apparatus which is constructed as the dual system. Those elements of FIG. 2 which correspond to those in FIG. 1 have been given like reference numerals.

In FIG. 2, the power conversion control apparatus is comprised of two systems 101 and 102 and pulse amplification circuit 30A. The controlled variables are harmonized in a stage preceding phase control circuits 29C and 29D in order to avoid variation of the output of the respective systems. Typically, the harmonization for the controlled variables is done by providing the output value of the control advance angle priority circuit 28C of system 101 and the output value of control advance angle priority circuit 28D of system 102 to a selection circuit 50C, which selects the controlled variables to be output to the phase control circuit 29C. A selection circuit 50D performs the same operation for system 102. When one of the systems 101 or 102 of the power conversion control apparatus operates abnormally, the outputting of the controlled variables of the abnormal system is halted and the abnormal system is isolated. Further, the selection circuit 50C or 50D of the normal system operates so as to not select the controlled variables of the abnormal system.

However, when the constant-current control circuits 13C and 13D utilize an algorithm which includes integration, the following problems can occur.

When forward power conversion operation is performed by the two systems 101 and 102, the selection by the selection circuits 50C and 50D is done based on a phase lag priority. There can exist a discrepancy in the current detection such that the detection is performed for the system 102 at a somewhat lower level than for the system 101.

Accordingly, the current detection value IdA of system 101 is more than the current detection value IdB of system 102. Further, when the current reference value IdpA of system 101 is equal to the current reference value IdpB of system 102, the difference ΔIdA between the current reference value IdpA and the current detection value IdA of system 101 is less than the difference $\Delta$ IdB between the current reference value IdpB and the current detection value IdB of system 102.

$$\Delta IdA = IdpA - IdA$$

$$\Delta IdB = IdpB - IdB$$

$$\Delta IdA < \Delta IdB$$

Moreover, the output EcA of difference amplifier (not shown) which utilizes the integration algorithm in the constant-current control circuit 13C is less than the output EcB of difference amplifier (not shown) utilizing the integration algorithm in the constant-current control circuit 13D.

$$EcA < EcB$$

Since the selection by the selection circuits 50C and 50D is done by phase lag priority because of the forward power conversion operation, the value used for control is the output EcA of the difference amplifier (not shown) 5 utilized in the constant-current control circuit 13C.

When the current reference value IdpA is equal to the current detection value IdA, the difference $\Delta IdA$ of system 101 becomes zero and the difference $\Delta IdB$ of system 102 becomes more than zero.

Accordingly, in the system 102, since the controlled variables of its own system are not selected, the controlled variables are integrated to a phase-advanced value by the integration algorithm utilized in the constant-current control circuit 13D and each of the controlled variables will approximate the limit value. To state this in another way, the system 101 does not require correction since the reference value equals the measured value (IdpA = IDA). However, system 102 does require negative feedback since IdpB is not equal to IdB but utilizes control parameters from 101, thus leading the integration circuit to saturation.

Additionally, when a problem occurs in system 101 and the system 101 is isolated, the phase of system 101 is advanced to the phase for operating the controlled variables of system 102 immediately upon the isolation of the system 101. In this situation, when the controlled variables of system 102 are very advanced, this can lead to saturation upon changeover. The controlled variables of system 102 would approximate the limit level as described above.

Accordingly, the control of the DC system is disturbed. Furthermore the instantaneous change of operating condition of the converter may have an adverse effect on the system and/or equipment. This situation occurs in the same way even if the selection circuits 50C and 50D are operated by phase-advance priority. Some discrepancy in the detection systems of dual control systems is inevitable, and even this expected level of discrepancy can result in the integration system becoming saturated.

SUMMARY OF THE INVENTION

It is therefore an object of the invention to provide a power conversion control apparatus which can be operated with harmonized control variables without saturation even though an integration algorithm is utilized in the constant-current control circuit.

To achieve the above and other objects according to the invention, the power conversion control apparatus comprises a constant current control circuit having an integrating amplifier circuit. The power conversion control apparatus is comprised of a dual control system and selecting circuit wherein the selecting circuit determines the magnitude of the output of the integrating amplifier circuit of its own system and the output of the integrating amplifier of the other system and selects one as an output. The constant current control circuit applies a signal responsive to the difference between the output of the integrating amplifier circuit of its own system and the output of the selecting circuit of its own system as correction signal to the input of the integrating amplifier of its own system.

The power conversion control apparatus, according to the invention, compares the output value of the constant current control circuit of one system with the output value of the constant current control circuit of the other system, and selects one of the output values. A correction value is obtained by multiplying the difference between the selected output value and the output value of the constant current control circuit of the one system by an optional constant. The correction value is added to the input of the constant current control circuit. The correction value is zero in the case where the output value of the constant current control circuit of its own system is selected, but, otherwise, is matched to the output of the other system.

Accordingly, since the correction is always applied to the constant current control circuit of the system whose the output value is not selected, even though integration is performed, saturation cannot occur.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the invention. Like elements have been given like reference numerals.

DETAILED DESCRIPTION OF THE PREFERRED EMBODIMENTS

Figure 1:
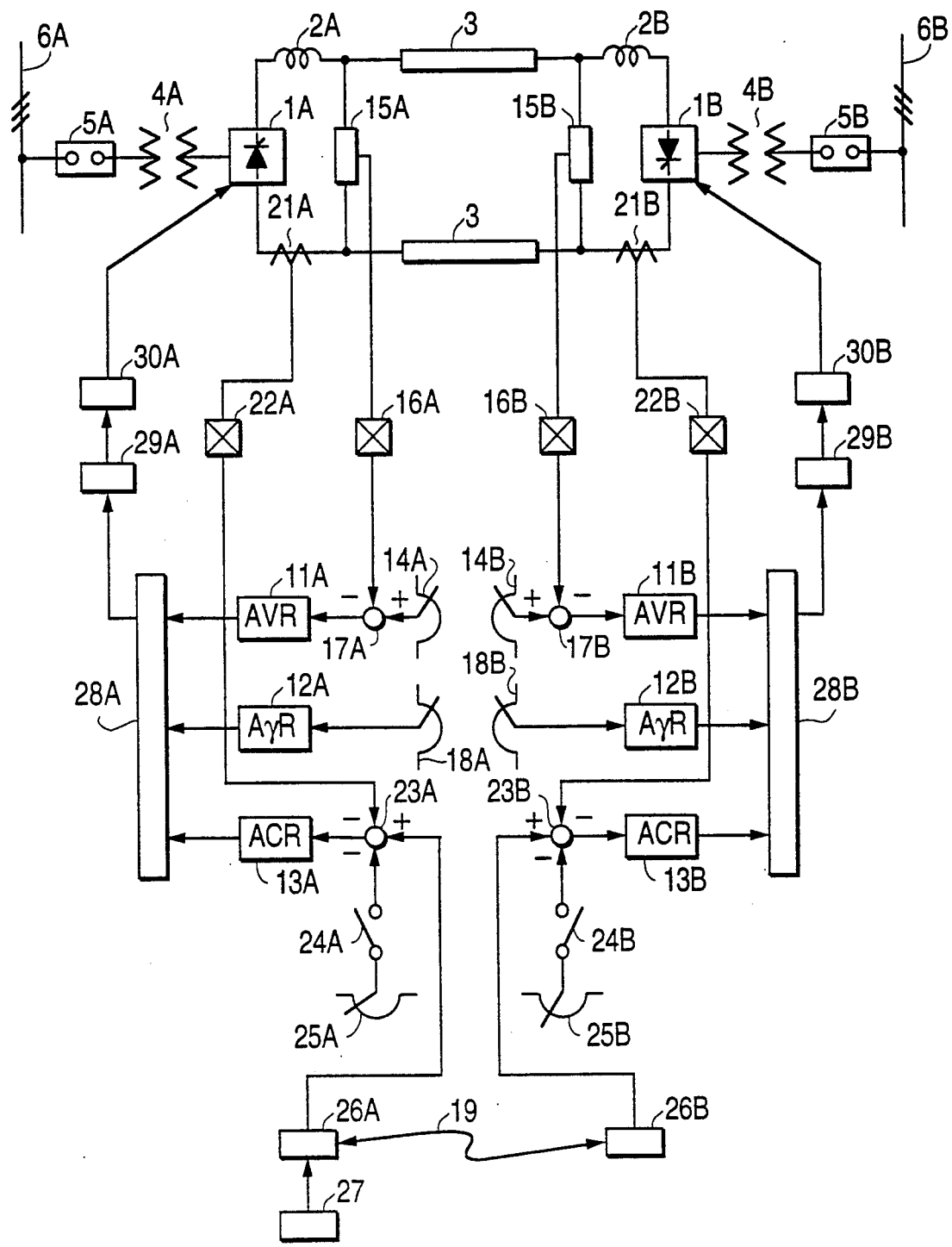
FIG. 1 is a schematic block diagram illustrating the structure of a power conversion system.
Figure 2:
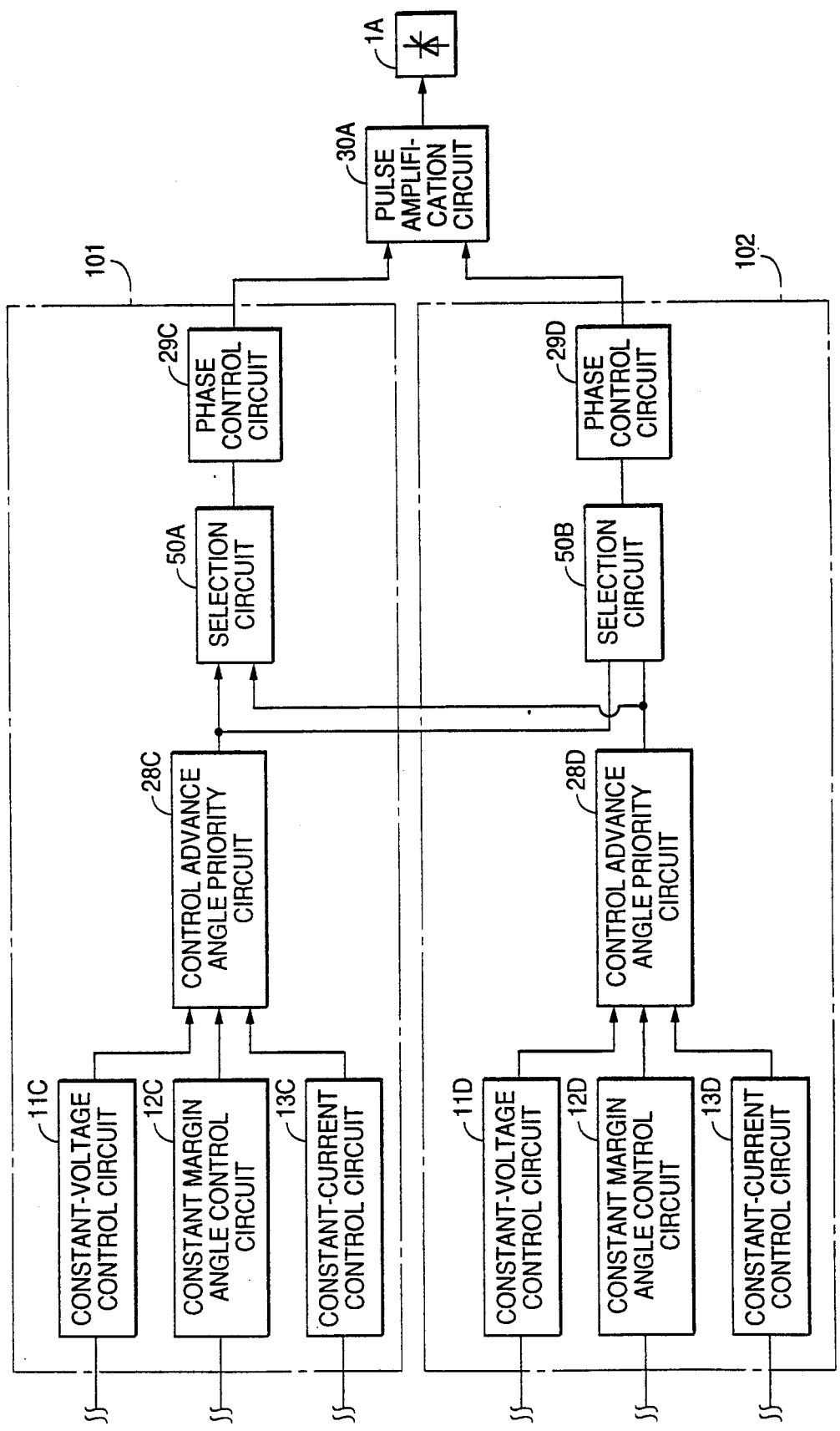
FIG. 2 is a schematic block diagram illustrating the structure of a prior art power conversion control apparatus of the power conversion system in FIG. 1.
Figure 3:
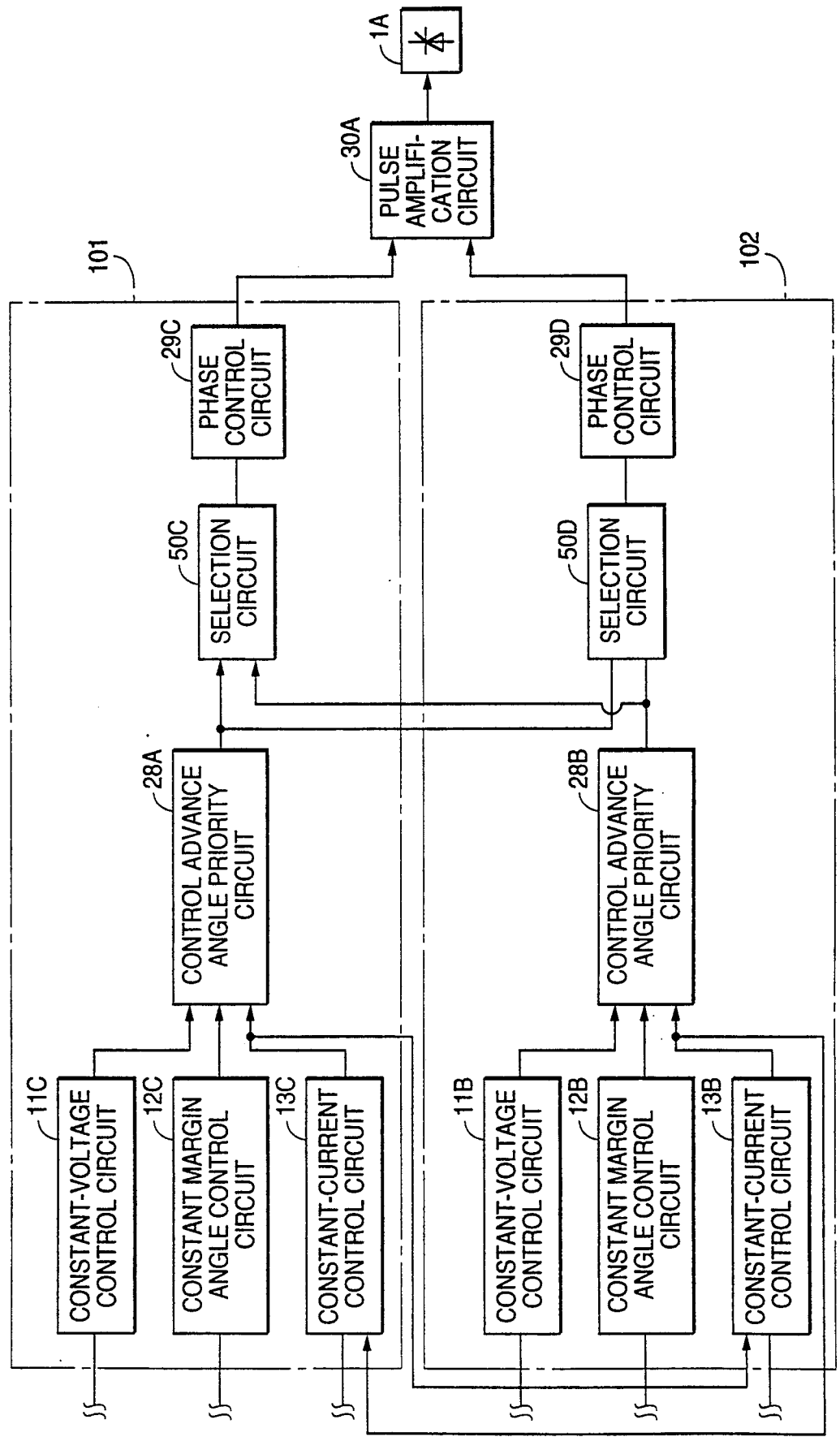
FIG. 3 is a schematic block diagram illustrating the structure of a power conversion control apparatus of one embodiment of the invention.

FIG. 3 shows the hardware structure in a power conversion system according to one embodiment of the invention.

A control system 101 comprises a constant-voltage control circuit 11C, constant margin angle control circuit 12C, constant-current control circuit 13C, control advance angle priority circuit 28C, selection circuit 50C, and phase control circuit 29C.

Figure 4:
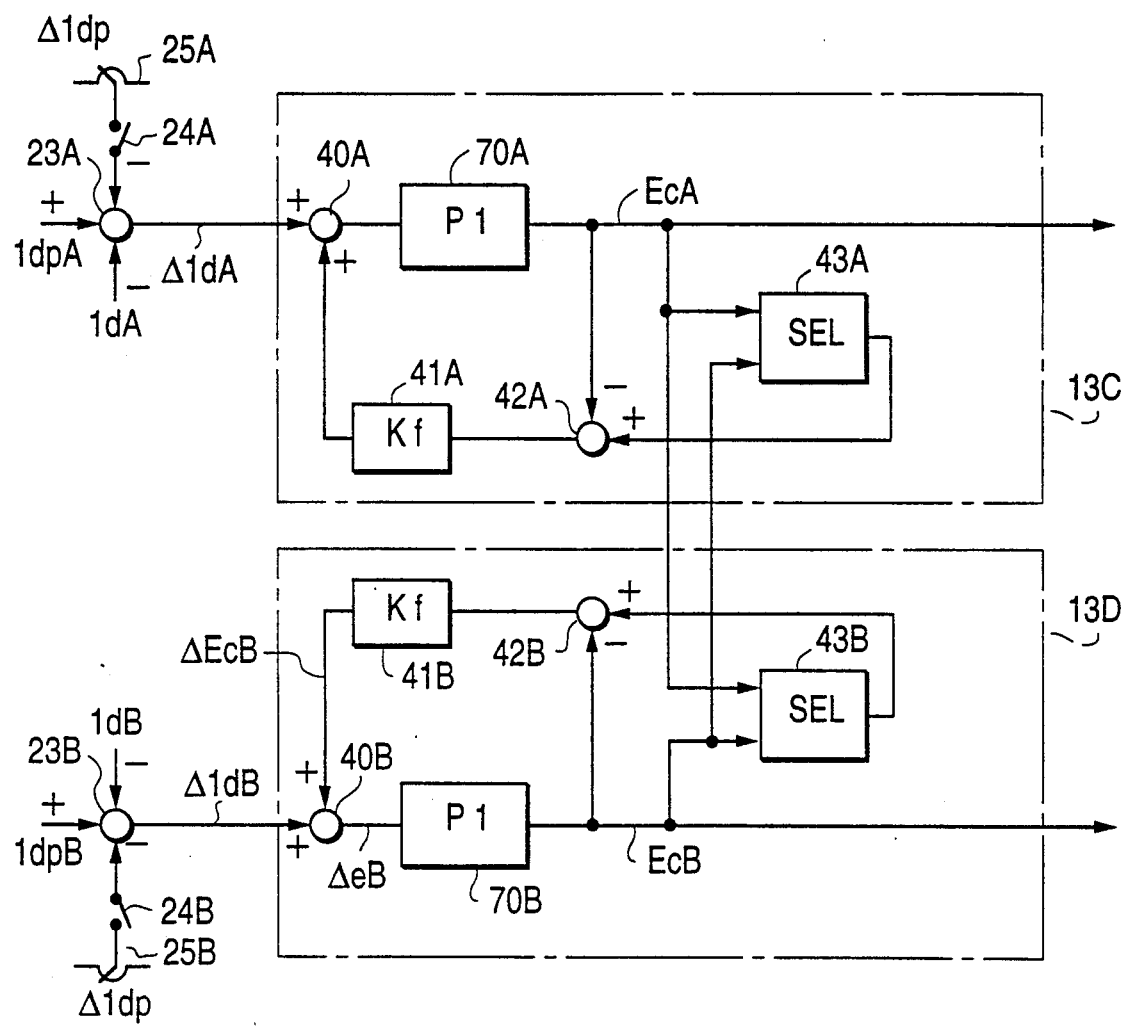
FIG. 4 is a schematic block diagram illustrating the structure of a current control circuit of FIG. 3.

Further, as shown in FIG. 4, the constant-current control circuit 13C has summing circuits 40A and 42A, multiplying circuit 41A, selection circuit 43A, and error amplifier 70A which includes an integrating algorithm. The control circuits 101 and 102 are identical and the constant-current control circuits 13C and 13D are identical.

The output value of constant-voltage control circuit 11C, the output value of constant margin angle control circuit 12C, and the output value of constant-current control circuit 13C are input to the control advance angle priority circuit 28C. The control advance angle priority circuit 28C selects the one of the three input control parameter signals as the control advance signal which will result in the most advanced control angle. The output value of constant-current control circuit 13C is provided to the constant-current control circuit 13D of the other system. The selection circuit 50C compares the output value of control advance angle priority circuit 28C and the output value of control advance angle priority circuit 28D and selects a control value which is provided as a control signal to the phase control circuit 29C.

Next, the operation of constant-current control circuits 13C and 13D will be described.

The current reference values of systems 101 and 102 are designated as IdpA and IdpB respectively, and the current detection values of systems 101 and 102 are designated as IdA and IdB, respectively.

When power forward conversion operation is performed with the two systems, if there is a discrepancy between the detection of the two systems such that system 102 detects current magnitude at a lower level than the detection circuit in the system 101, the selection circuit outputs the output EcA of error amplifier 70A. The selection circuits 43A and 43B give priority to the phase lag, similarly to the selection circuits 50C and 50D.

Accordingly, the output ΔEcB of multiplying circuit 41B is less than zero and the input ΔeB of the error amplifier 70B is indicated as follows:

$$\Delta eB = (IdpB - Idb) + (EcA - EcB) \times kf$$

Kf indicates an optional constant which is set in the multiplying circuits 41A and 41B.

When the difference between the current reference value IdpB of system 102 and the current detection value IdB of system 102 is more than zero and the output ΔEcB of multiplying circuit 41B is less than zero, the input ΔEcB is added with reversed polarity to the one input ΔIdB of error amplifier 70B.

Consequently, the saturation of error amplifier 70B can be prevented.

According to this embodiment, when the power conversion system is constituted by a dual system, even when the constant-current control circuit includes an integration algorithm, control can be performed by the two systems and saturation resulting from the integration algorithm can be avoided.

Accordingly, even if abnormality is detected in one system, the abnormal system can be isolated without disturbing the control condition.

Although this embodiment has been described with reference to a dual system, it is not restricted to dual systems but could be put into practice in the same way for multiple systems.

Further, additional advantages and modifications will readily occur to those skilled in the art. Therefore, the invention in its broader aspects is not limited to the specific details, representative devices, and an illustrated example shown and described herein. Accordingly, various modifications may be made without departing from the spirit or scope of the general inventive concept as defined by the appended claims and their equivalents.

What is claimed is:

1. A power conversion system comprising:
   a converter; and
   first and second control systems providing control signals, each of said control systems including,
   voltage control means for calculating a voltage difference between a voltage detection value and voltage reference value and for amplifying said voltage difference, said voltage control means outputting a voltage control signal;
   margin angle control means for setting a margin angle and tracking the margin angle of said converter to the set margin angle, said margin angle control means outputting a margin angle control signal;
   current control means for calculating a current difference between a current detection value and a current reference value and for amplifying said current difference, said current control means including an input of said amplified current difference from another current control means, said current control means including a selector for selecting between its own amplified current difference and said amplified current difference from said other current control means and outputting said selected current difference as a current control signal;
   control advance angle priority means for selecting the output which has the most advanced control angle of the control signals output from the current control means, voltage control means, and margin angle control means, and outputting a control advance angle priority signal;
   selection means for selecting one of said control advance angle priority signals output from said first control system and from said second control system according to the condition of the control systems; and
   converter control means for controlling the converter in response to the output from the selection means.

2. A power conversion system including first and second control systems and a converter, each of said control systems comprising:
   voltage control means for calculating a difference between a voltage detection value and voltage reference value and for amplifying said difference and outputting a voltage control signal;
   margin angle control means for setting a margin angle and tracking the margin angle of said converter to the set margin angle and outputting a margin angle control signal;
   current control means for generating outputting a current control signal, said current control means including,
   an integrating amplifier for outputting an error difference signal between a current reference signal and a detected current value,
   first selection means for selecting between said error difference signal of said first system and said error difference of said second system according to the magnitude and outputting said selected current error difference signal as said current control signal,
   means for applying a correction signal to an input of said integrating amplifier, said correction signal indicating a difference between the output of the integrating amplifier and said selected current error difference signal;

control advance angle priority means for selecting the control signal which has the most advanced control angle of said current control signal, voltage control signal, and margin angle control signal, and outputting a control advance angle priority signal;

second selection means for selecting one of the control advance angle priority signals of said first control system and said second control system according to the condition of the control systems and outputting a converter control signal; and converter control means for controlling the converter in response to said converter control signal.

3. A method of converting power in a power conversion system including first and second control systems and a converter, comprising the steps of:

calculating a difference in a voltage control means between a voltage detection value and voltage reference value, amplifying said difference, and outputting a voltage control signal;

setting a margin angle and tracking the margin angle of said converter to the set margin angle in a margin angle control means and outputting a margin angle control signal;

calculating a current error difference signal between a current reference signal and a detected current value, amplifying said difference in an integrating amplifier;

selecting between said error difference signal of said first system and said error difference of said second system according to the magnitude and outputting a selected current error difference signal as a current control value;

applying a correction signal to an input of said integrating amplifier, said correction signal indicating a difference between the output of the integrating amplifier and said selected current error difference signal;

selecting the control signal which has the most advanced control angle of said current control signal, voltage control signal, and margin angle control signal in a control advance angle priority means and outputting a control advance priority signal;

selecting one of said control advance priority signals from the control advance angle priority means of said first control system and of said second control system according to the condition of the control systems and outputting a selected control advance priority signal; and controlling the converter in response to said selected control advance priority signal.

* * * * *